A. SUNDH.
POWER TRANSMISSION SYSTEM.
APPLICATION FILED FEB. 13, 1909.
1,036,743.
Patented Aug. 27, 1912.
6 SHEETS—SHEET 1.
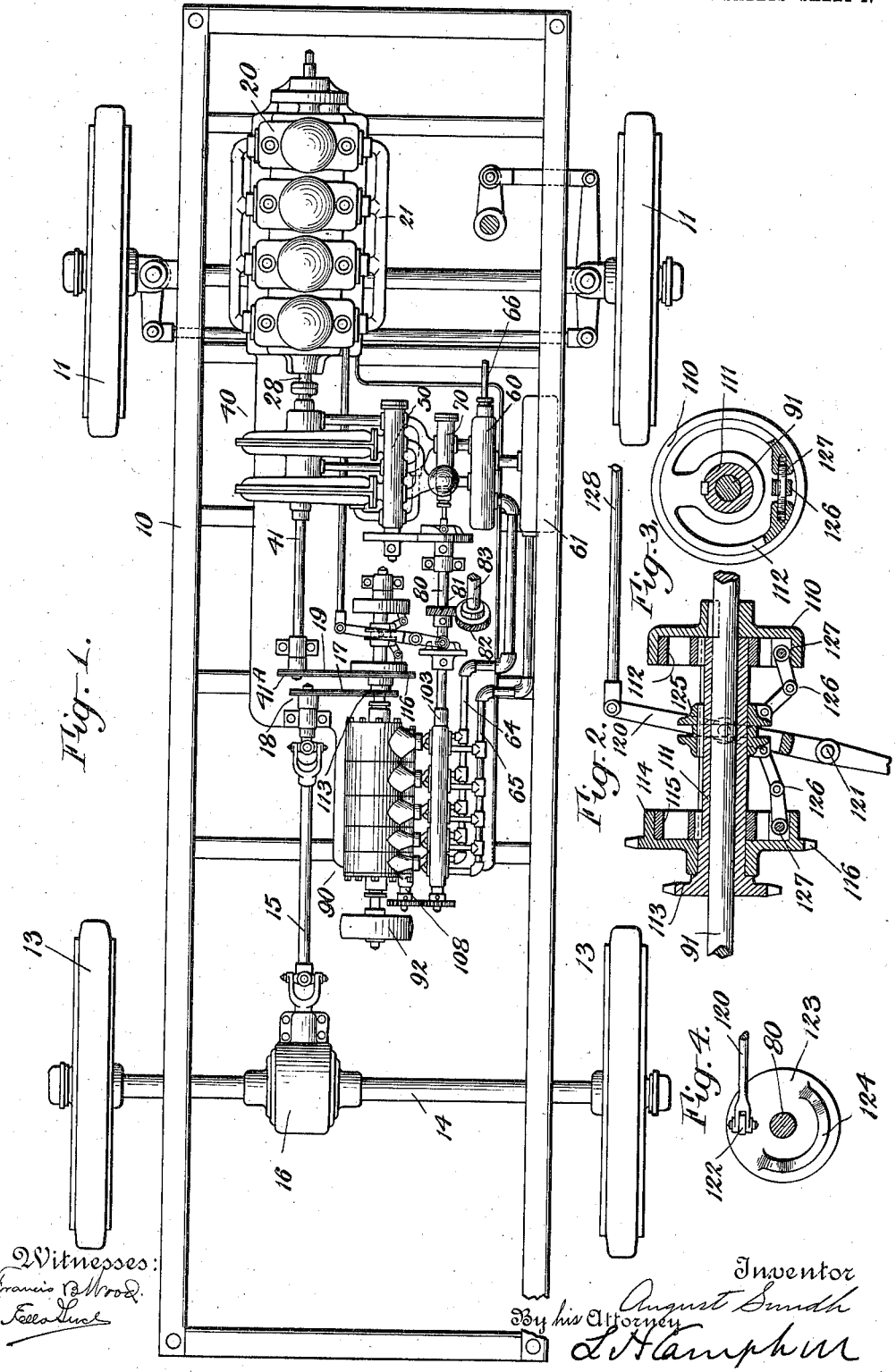
Witnesses:
Inventor
August Sundh
By his Attorney

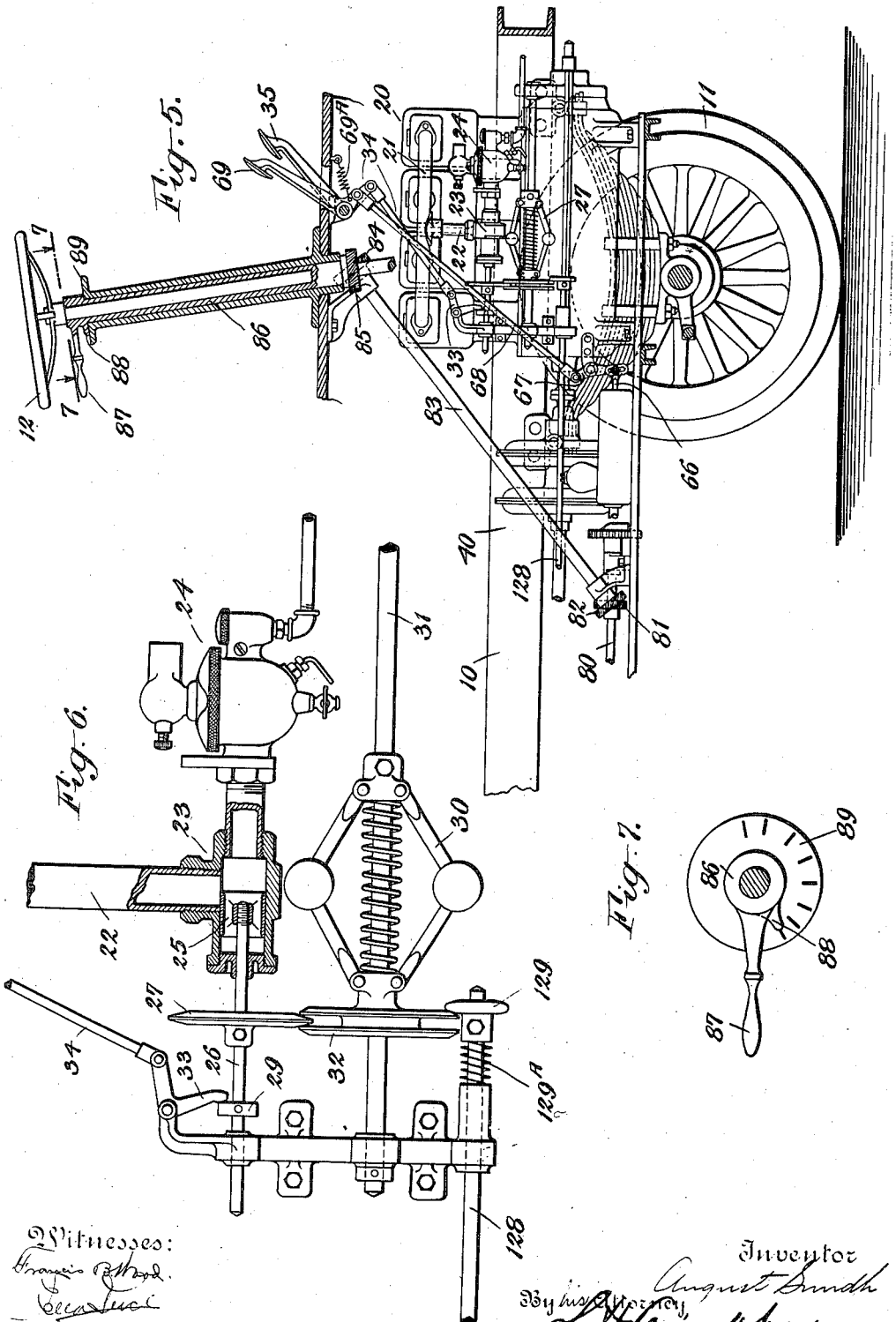

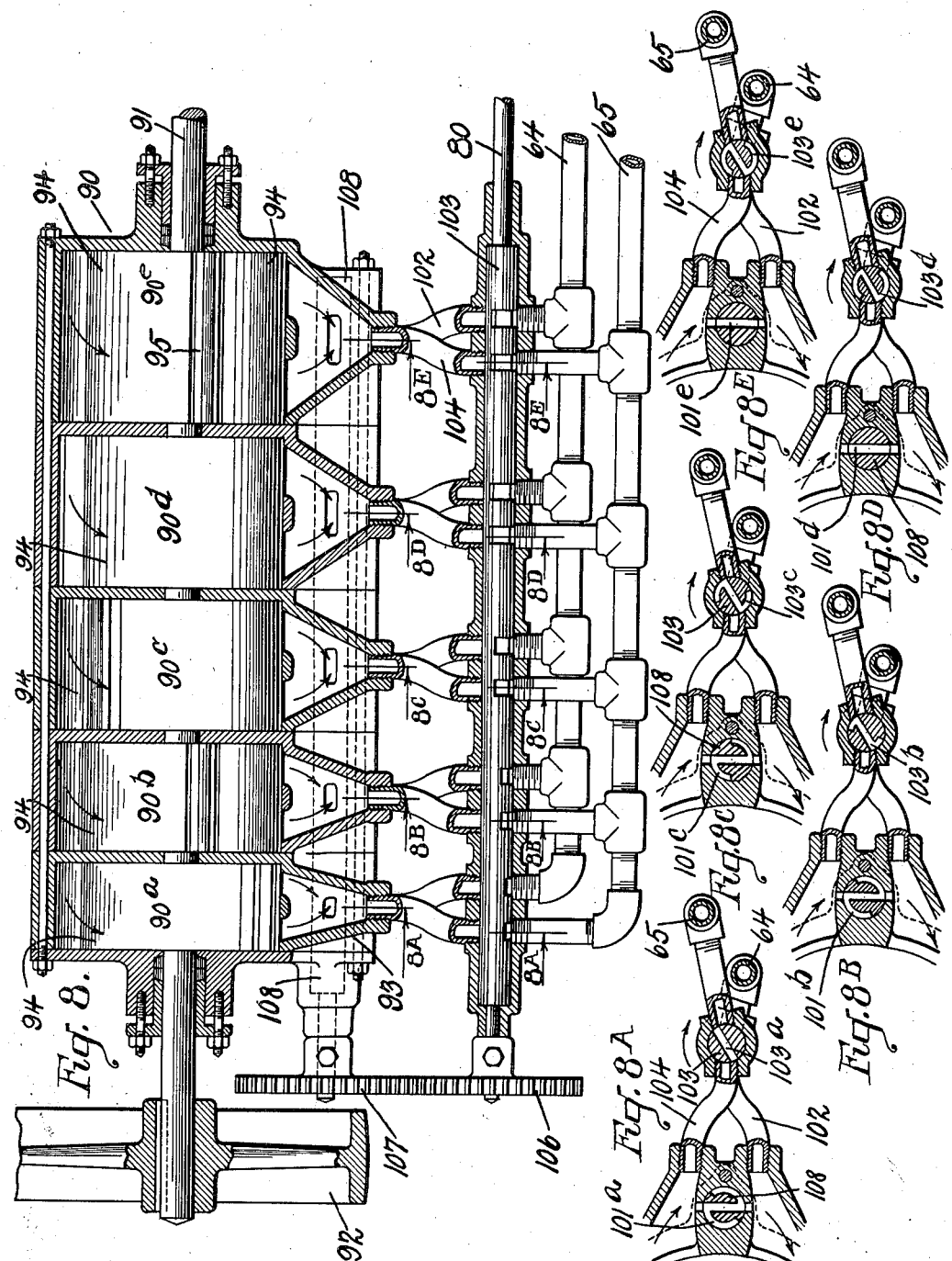

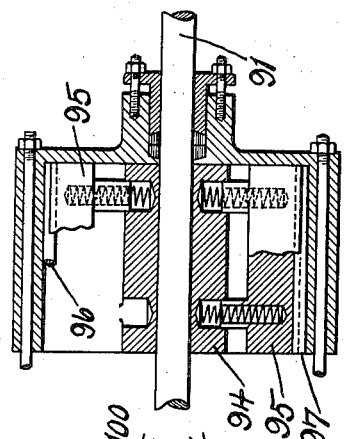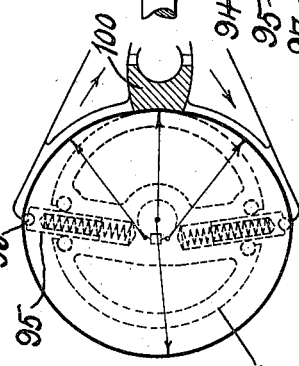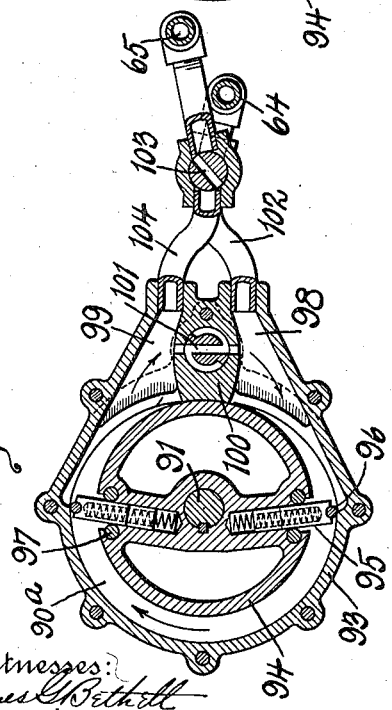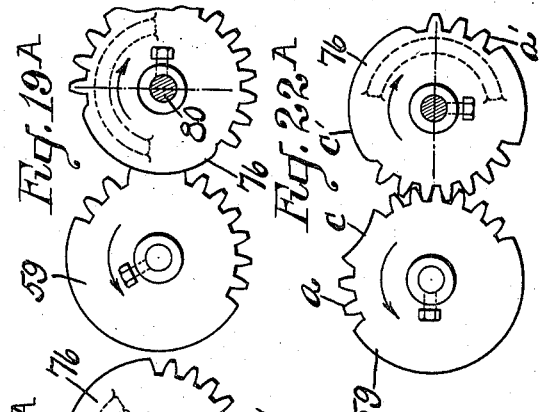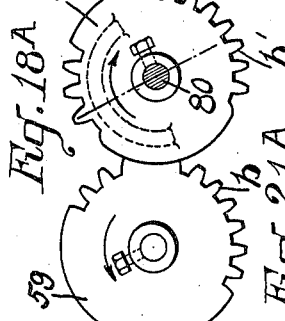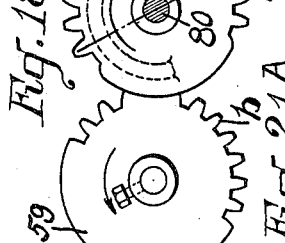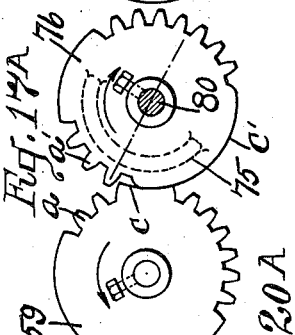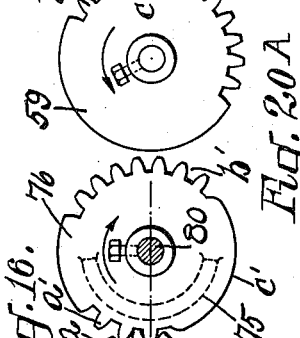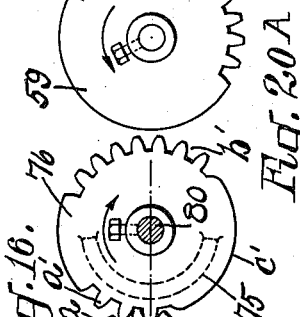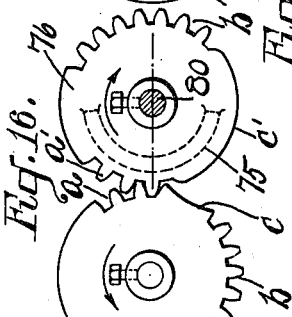

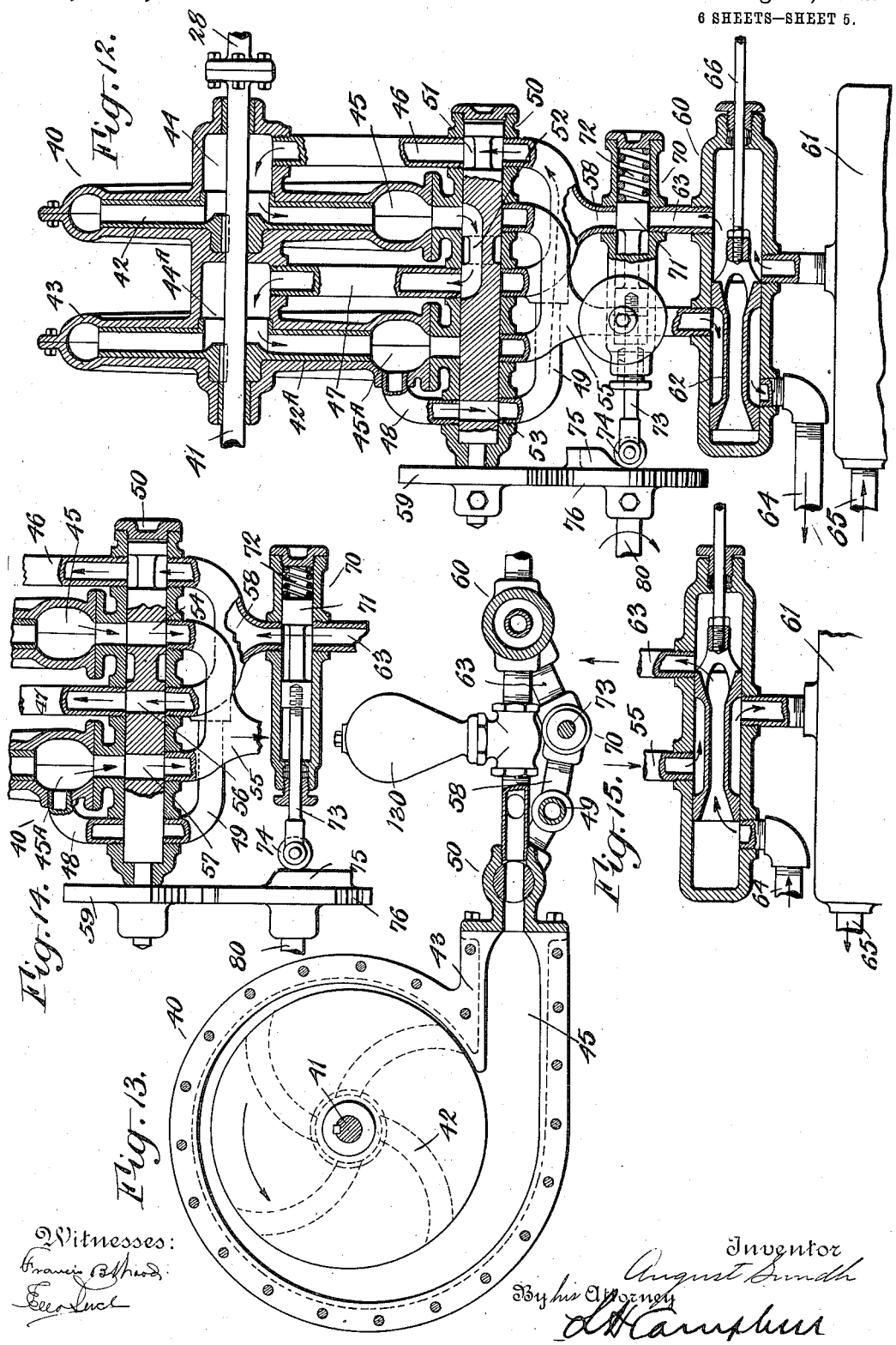

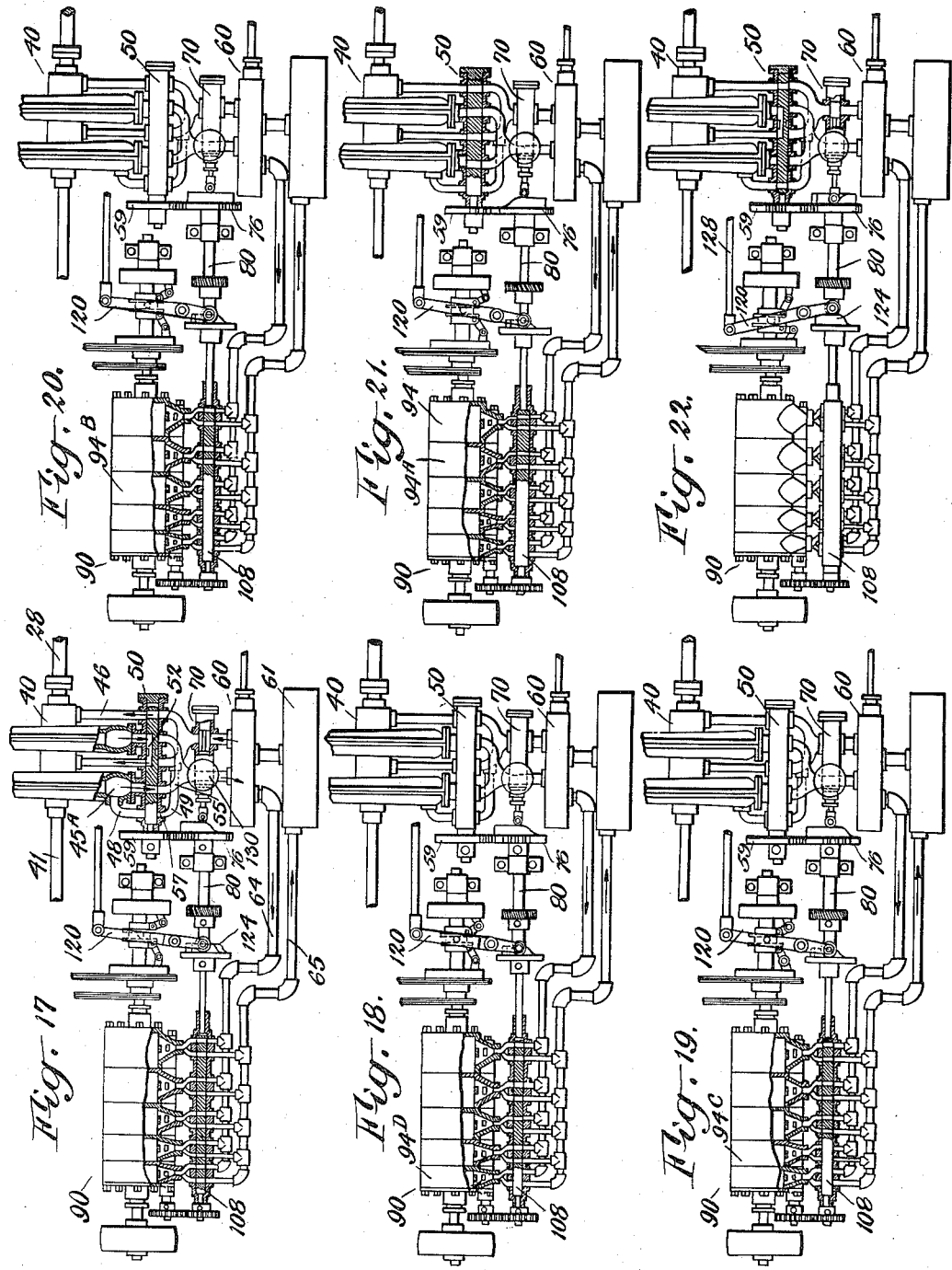

UNITED STATES PATENT OFFICE.

AUGUST SUNDH, OF YONKERS, NEW YORK ASSIGNOR TO OTIS ELEVATOR COMPANY, OF JERSEY CITY, NEW JERSEY, A CORPORATION OF NEW JERSEY.

POWER-TRANSMISSION SYSTEM.

1,036,743.

Specification of Letters Patent. Patented Aug. 27, 1912.

Application filed February 13, 1909. Serial No. 477,749.

*To all whom it may concern:*

Be it known that I, AUGUST SUNDH, a citizen of the United States, residing at Yonkers, in the county of Westchester and State of New York, have invented a new and useful Improvement in Power-Transmission Systems, of which the following is a specification.

My invention relates to power transmission systems whereby the power generated by a prime mover may be transmitted to a driven mechanism in either direction and at different speeds which can be varied at will.

The invention also provides a manually operated device for controlling the transmission mechanism and many other features which I will describe in the following specification and the novel features of which I will set forth in the appended claims.

Referring to the drawings, Figure 1 is a top plan view of the running gear of an automobile truck showing an embodiment of my invention applied thereto. Fig. 2 is a sectional plan view of a clutch mechanism and some of its connected parts. Fig. 3 is an end view, partly in section, of the clutch. In Fig. 4 an end view of a cam-plate on the controlling shaft and its coöperating lever or arm is illustrated. Fig. 5 is a side elevation of the forward part of the truck, showing the engine and a part of the transmission device, together with the control mechanism for the engine and the transmission device. Fig. 6 is a side elevation, partly in section, of a portion of the engine control device. This figure shows a centrifugal governor arranged to automatically control the speed of the engine together with certain mechanical connections by means of which the effect of this governor may be modified at will. Fig. 7 is a sectional plan view on the line 7—7 of Fig. 5. Fig. 8 is a sectional plan view of a hydraulic or fluid pressure motor together with its controlling valves which I use in carrying out my invention. Figs. 8ᴬ, 8ᴮ, 8ᶜ, 8ᴰ, and 8ᴱ are detail sectional views as indicated by the correspondingly designated section lines on Fig. 8. Figs. 9 and 10 are end and vertical sections, respectively, through one of the motor members, showing their construction somewhat in detail. Fig. 11 is a diagrammatic end elevation of one of the motor sections or members. In Fig. 12 I have shown in sectional plan view a pump mechanism with its connected controlling valves. Fig. 13 is a sectional end elevation through one of the members of this pump. Fig. 14 is a sectional plan view of a part of the pump with its controlling valve shown in a different operative position than that in which it is shown in Fig. 12. A reversing valve is shown in Fig. 15 in sectional plan view. Fig. 16 is an end view of a pair of mutilated gears, which form a part of the control mechanism. Figs. 17 to 22, inclusive, show diagrammatically the pump and the motor, and other parts of the transmission gear with their connecting ports and other parts in different relative positions. These, of course, as will appear hereinafter, are for the purpose of more clearly illustrating the operation of this invention. Figs. 17ᴬ, 18ᴬ, 19ᴬ, 20ᴬ, 21ᴬ, and 22ᴬ are views of the mutilated gears shown in Fig. 16 and illustrate these gears in the positions corresponding to Figs. 17, 18, 19, 20 and 21 respectively.

Like characters of reference designate corresponding parts in all of the figures.

10 designates a truck upon which the various parts of the apparatus are mounted. 11 are its forward wheels which may be guided by means of a steering-wheel 12 and suitable connecting mechanism. 13 are the rear wheels of the truck which may be mounted upon a journal 14 which is arranged to be driven by a transmission shaft 15 and suitable gearing 16. These, as well as other parts of the truck, form no part of the present invention and I will therefore not describe them more fully.

20 designates a prime mover which, in this case, is shown as a four-cylinder, four-cycle gasolene engine but which, for the purpose of this invention, may be any other form of internal combustion engine or other desired form of prime mover. 21 is its inlet or supply pipe which is connected by a pipe 22 through a throttle valve 23 with a carbureter 24. The throttle valve 23 comprises a piston 25 upon a slidable rod 26. A disk 27, affixed to this rod, is arranged to be automatically or positively shifted to determine the position of the throttle valve.

30 designates a centrifugal governor mounted upon a horizontally disposed shaft 31 which is driven by the engine through suitable gearing. A grooved disk 32 is shifted back and forth upon the shaft 31 by the governor. The disk 27 fits into the groove in the periphery of disk 32 and transmits this longitudinal movement of the disk 32 to the piston of the throttle valve. It is obvious that these parts are arranged to maintain the speed of the engine at a substantially constant rate under normal conditions. The effect of the governor may, however, be modified as will be set forth fully hereinafter.

40 designates a two-part centrifugal pump. 41 is the shaft of this pump which is directly coupled to the engine shaft which is designated in the drawings by 28. The rotary members 42 and 42$^A$ of the pump are keyed to this shaft 41 and are inclosed by a casing 43. These rotary parts of the pump will therefore act as a balance-wheel for the engine. The casing 43 is constructed to form the various ports for the pump. 44 is the inlet-port for the first pump member and 44$^A$ the inlet in the second pump member. 45 and 45$^A$ designate the discharge chambers for the pump. 50 is a rotary valve arranged to control these ports in the following manner: When the valve is in the position in which it is shown in Fig. 12 water or other fluid is admitted through a port 51 and pipe 46 to the intake port 44. The fluid then passes through the first pump member to its discharge chamber 45, and through a port 52 and pipe 47 to the intake port 44$^A$. The fluid will then pass through the second pump member to its discharge chamber 45$^A$ and out through a pipe 48, a valve port 53 and a pipe 49 which is connected with the port 51. Thus the fluid is allowed to circulate freely through the two parts of the pump 40. When the rotary valve 50 is rotated into the position in which it is shown in Fig. 14 the fluid will pass into the first pump member as before, but in this case a port 54 connects the discharge chamber 45 with a discharge pipe 55. A port 56 in the rotary valve connects the supply with the pipe 47 leading to the intake port 44$^A$, and a port 57 connects the discharge chamber 45$^A$ with the discharge pipe 55. In this position of the rotary valve the passage between the pipes 48 and 49 is closed. The pump members are therefore connected to work in parallel.

A third operative position of the rotary valve is shown in Fig. 17, in which case the supply is connected with the first pump member through pipe 46 as before and the port 52 is, as in the first case, arranged to connect the discharge of the first pump member with the intake of the second; but the passage between the pipes 48 and 49 is closed while the port 57 connects the discharge chamber 45$^A$ with the discharge pipe 55. In this position of the controlling valve 50 the pump members are arranged to work in series.

60 is a reversing valve interposed between a supply tank 61 and the pump. When in the position in which it is shown in Fig. 12 with its piston 62 pushed back it connects the supply tank 61 with a pipe 63 leading to the intake pipe 58 through an intermediate valve 70 and at the same time the discharge pipe 55 is connected with a supply pipe 64. 65 is a return pipe to the tank, and 66 is the reversing-valve piston-rod. With the piston drawn forward as it is shown in Fig. 15 the supply pipe 64 is connected with the intake of the pump, and the discharge pipe 55 is connected with the tank 61.

Between the supply and the discharge pipes of the pump is placed the intermediate valve 70. This comprises a piston 71 which is normally held by a compression spring 72 in a position to close the passage between the supply pipe 58 and the pipe 63 leading to the reversing valve.

73 is a piston rod connected with piston 71 and projecting from the valve 70 into the path of movement of a cam 75. An anti-friction roller 74 is preferably provided on the end of this piston rod. This cam is arranged to push over the intermediate valve-piston into the position indicated in Fig. 14 to open the passage between the pipes 58 and 63.

80 designates the controlling shaft to which is affixed a mutilated gear 76 one of the faces of which is constructed to form the cam surface 75. 59 is another mutilated gear mounted on the end of the rotary part of the valve 50 and in mesh with the gear 76 and arranged to be actuated thereby. A gear 81 is affixed to the controlling shaft and a similar gear 82 on the end of a connecting shaft 83 is in mesh therewith. Another pair of gears 84 and 85 connect this shaft with a sleeve 86 which surrounds the steering-wheel. A hand-lever 87 is affixed to or is an integral part of this sleeve at its upper end. A pointer 88 may also be connected with this sleeve and arranged to move over a stationary dial-plate 89. This pointer and dial indicate to an operator the various positions of the controlling mechanism.

Referring to Fig. 16, the mutilated gear wheel 59 is provided with gear teeth $a$ and $b$ adapted to mesh with gear teeth $a'$ and $b'$ respectively on the gear wheel 76. Between the gear teeth $a$ and $b$ is a cam surface $c$ adapted to engage a surface $c'$ on the gear 76 and hold the gear 59 locked against rotation. The relative positions of these gears in the successive steps of the operation as hereinafter set forth, are shown in Figs. 17$^A$ to 22$^A$.

90 designates a fluid pressure motor by means of which the power generated by the engine is transmitted to the transmission shaft 15 and to the rear wheels of the truck. 91 is its shaft to one end of which a flywheel 92 may be affixed. 93 designates the casing of this motor which is divided up, as shown, into a plurality of separate chambers $90^a$, $90^b$, $90^c$, $90^d$, $90^e$. Within these chambers, circular skeleton wheels 94, are placed, mounted, as may be seen from Figs. 9, 10 and 11, on the motor shaft 91. Each of these wheels carries a pair of blades 95, spring-pressed outward against the inner surface of the casing and provided on their outer ends with metallic or other suitable packing 96. In order to facilitate the free movement of the blades 95 in these wheels, roller bearings 97 may be provided as shown. 98 and 99 designate the intake and discharge pockets for these motor chambers, which pockets are separated by a part 100 of the casing against which the surface of each skeleton wheel 94 bears. In this portion 100 of the casing is a by-pass valve cylinder 108 provided with a port for each motor section, through which, when open, the fluid within the casing may freely circulate. These ports are designated $101^a$, $101^b$, $101^c$, $101^d$, $101^e$.

Each of the inlet pockets 98 is connected by a pipe 102 with the supply pipe 64. The discharge pockets 99 are likewise connected through pipes 104 with the return pipe 65. A rotary valve 103 controls the flow of fluid through the pipes 102, 104 and is provided with a pair of ports for each pump section. The ports controlling the flow to and from the sections $90^a$, $90^b$, $90^c$, $90^d$, $90^e$ are designated respectively $103^a$, $103^b$, $103^c$, $103^d$, $103^e$. The valve 103 is rigidly connected with the controlling shaft 80.

On the end of the controller shaft 80 is fixed a gear 106 which is in mesh with a similar gear 107 keyed to the end of the rotary valve member 108. This valve member is arranged to close the by-passes to each of the chambers or sections of the motor at the time its inlet and discharge ports are opened by the valve 103.

The construction of the motor cylinder and the coöperating rotary parts within its chambers is diagrammatically illustrated in Fig. 11. It is evident that when water, oil, or other liquid or fluid is admitted under pressure to one or more of the motor members through the intake pockets and led off from the discharge pockets, the shaft 91 will be rotated thereby.

A clutch housing 110 is keyed to the motor shaft 91. 111 is a sleeve loosely mounted upon the shaft 91. To one end of this sleeve is keyed a clutch member 112 which, when in the position indicated in Fig. 2, is arranged to connect the housing 110 and the sleeve 111 to cause the rotation of the shaft to be imparted to the sleeve 111. The other end of the sleeve is constructed to form a sprocket-wheel 113 which is connected by a chain 17 with a similar sprocket-wheel 18 connected with the end of transmission shaft 15. The rotation of the motor shaft 91 will therefore be transmitted through the parts above pointed out to the transmission shaft 15 and to the wheels 13 of the truck.

114 is a clutch housing rotatably mounted upon the sleeve 111. A clutch member 115 keyed to the sleeve 111 is arranged, when moved into the position indicated in Fig. 22, to connect these two parts together. The outer periphery of the housing 114 is constructed to form a sprocket-wheel 116 which is connected by a chain 19 with a sprocket-wheel $41^A$ keyed to the end of the pump shaft 41. These clutches are so arranged that they cannot both be operative at the same time. When the clutch member 115 is actuated to connect the housing 114 with the sleeve 111 the rotation of the engine shaft 28 will be imparted to the truck-wheels 13 through the shaft 41 and the chains 19 and 17, and the other parts above pointed out. 120 is an actuating lever pivoted at 121 by means of which these clutches are operated. An antifriction roller is provided in one end of this lever which is arranged to coöperate with a cam-plate 123 affixed to the controlling shaft 80. A cam surface 124 protruding from this plate is arranged to push the lever 120 over into the position shown in Fig. 22 to release the clutch member 112 from its housing 110 and to force the clutch member 115 against its housing 114. 125 is a collar slidably mounted upon and splined to the sleeve 111 which is connected with lever 120 and arranged to cause its sliding movement to actuate the cams through links 126 and right and left-hand screws 127.

A rod 128 pivotally connected with one end of lever 120 extends forward to a position near the governor 30. A collar 129 affixed to this rod engages with the forward face of disk 32. It may be seen that these mechanical connections cause the lever to be held over in the position shown in Fig. 2 during the usual running of the apparatus and also cause the disk 32 to be pushed back whenever the lever 120 is pushed over by the cam 124. This last operation insures the full opening of the throttle valve under such conditions and renders the governor inoperative so that the apparatus may run as fast as desired. A spring $129^A$ bearing against collar 129 may be arranged to maintain the rod 128 in its forward position when it is not forced back by the cam 124.

33 is a bell-crank lever which is connected by a rod 34 with a treadle 35. The operator, by depressing the treadle 35, may push the bell-crank lever 33 over against the collar 29, affixed to the shaft 26, to thereby open the throttle valve 23 and to modify the effect of the governor.

A bell-crank lever 67 connects the reversing-valve piston-rod 66 with a rod 68 which is connected with a treadle 69. A spring 69^A usually maintains this treadle in its raised position to hold the reversing-valve piston in the position shown in Fig. 12. But the operator may, at will, depress this treadle to thereby shift the reversing-valve piston into its position shown in Fig. 15.

In describing the various mechanism shown in the drawings I have pointed out briefly their individual operations. I will now show how these parts coöperate to produce desired results. Initially the pump valve mechanism is in the position shown in Fig. 12. The valves controlling the fluid motor are also in the positions shown in Figs. 8 and 8^A to 8^D. When the engine is started it will drive the two-part centrifugal pump at a practically constant rate of speed under the control of the governor, and a fluid will circulate through the pump members freely. If the operator desires to start the driven mechanism, in this case the truck 10, he may turn the controlling shaft slightly by means of the handle 87 until the pointer comes over the second mark on the dial. The initial rotation of the shaft 80 rotates the gears 59 and 76 from a position shown in Fig. 16 to that of Fig. 17^A. The cam 75 on the gear wheel 76 moves the piston of the intermediate valve 70 to open position to connect the supply tank 61 with the intake of the first pump member. The valve 50 is also rotated in position to close the by-pass 53 and connect the discharge of the second pump with the discharge pipe 55. This pipe and the supply pipe 64 will lead fluid pressure to the motor 90. The initial rotation of the shaft 80 also imparts a slight rotation to the motor valve 103 in the direction indicated by the arrows in Figs. 8^A to 8^E and opens all the pipes 102 and 104. At the same time the valve 101 is rotated into position to cut off the by-passes 101^a, etc., to prevent local circulation of fluid in the pump sections. This first operative position of the pump and motor valves and ports is illustrated in Fig. 17. The pump members working in series will deliver their maximum pressure to all parts of the motor, and the motor will therefore develop its maximum torque. The quantity of fluid delivered to the motor will be comparatively small, and as this is distributed to all of its chambers, the speed developed will be low. The result will be that the truck will be started slowly but with an enormous driving torque. It is to be noted that an air chamber 130 is interposed between the discharge of the pump and the supply pipe 64 to equalize the pressure delivered to the pump. This will also modify the effect of the change of speed which takes place in steps as will be presently described, so that the acceleration of the driven mechanism will be more gradual. The valve 103 is now rotated into position to block the ports 103^a and therefore cut off the flow of fluid to and from the rear motor section 90^a. The by-pass valve 108 has at the same time been rotated to open the port 101^a and permit a local circulation in the motor section 90^a. During this movement of the motor valves the gear wheel 59 is held stationary by the interlocking cam faces $c$ and $c'$ as shown in Figs. 17^A and 18^A, so that the valve mechanism for the pumps remains unchanged. The obvious result will be the increase of the speed at which the shaft 91 is driven at the expense of its torque. The various sections of the motor may be made of different sizes and capacities, although preferably of the same diameter. As shown, this rear section is smaller than the others so that the effect of cutting it off will be slight. In a similar manner the sections 94^b and 94^c may be successively cut out as shown in Figs. 19 and 20, respectively, producing corresponding increases of speed and proportionately decreasing driving torques.

In the next step of speed control, which is illustrated in Fig. 21, the gear teeth $b'$ engage the gear teeth $b$ and rotate the gear wheel 59 to the position shown in Fig. 21^A, thereby rotating the pump port controlling valve 50 into the position shown in Fig. 21 and on a larger scale in Fig. 14, with the discharge of both of the pump members connected with the supply pipe 64. The ports 103^d and 103^e are so formed and positioned that during this last stop the pump sections 90^d and 90^e are not cut off. Thus the volume of fluid delivered by the pump is approximately doubled, but the pressure at which this fluid is delivered is decreased.

Another step of speed control, not illustrated, provides for cutting out motor section 90^d, leaving only one section of the motor in operative relation with the other parts of the mechanism.

In the final step which is shown in Fig. 22 the pump is cut out, and the valve 103 is rotated into position to cut off all the motor sections, the valve 108 at the same time being rotated into position to permit the free local circulation of fluid in all the motor sections. In this position the cam 124 will be brought into the position shown to shift the lever 120 to release the motor clutch and to actuate the engine clutch. Then the engine will directly drive the truck. The various parts are preferably so designed and proportioned to have this change take place at a time when the fluid pressure motor has accelerated the truck up to approximately the speed at which the engine shaft will drive it when thus coupled directly with the driving gear. If the governor has not opened wide the throttle valve 23, the mechanical connections between it and lever 120 will insure its full opening. In this connection it is to be noted that the operator may, at will,—during any of the above-described operations—throw this throttle valve wide open to speed-up the engine. When the engine is directly connected with the truck-driving mechanism the pump valve 50 will be in the position in which it is shown in Fig. 12 to cut it out of operative relation with the other parts of the transmission gearing and to allow the fluid within it to circulate freely.

It is evident that the various steps of speed-control may be reversed and that the operator may change the parts from one to any of the other operative positions quickly. While the pump is supplying fluid to the motor and the latter is operating in either direction, the fluid cannot circulate through the motor at a greater rate than that provided by the rotation of shaft 91, so that the motor may be used, if desired, to produce a braking effect. This may be further increased by changing the reversing valve, which, of course, provides means for causing the fluid to flow through the motor in the opposite direction. The motor and truck may also be run in a reverse direction at will under all of the conditions above described, with the exception of that shown in Fig. 22.

From the above it may be seen that this transmission mechanism provides a simple and direct method of reducing motion from a high to a low speed and vice versa with an inversely corresponding variation of driving torque. The devices employed are light and have few wearing parts. While I have shown the invention applied to an automobile, it is evident that it may be applied to any kind of mechanism which is to be driven at variable speeds and torques, such, for example, as elevators or railroad-cars. Its value is clearly seen in connection with automobiles as their motive power and transmission gearing must be light, and in order to get sufficient power, high-speed motors must be used. This device provides for starting the engine with no load and for running it with no load, while the driven machinery is at rest. It also provides for utilizing the full horse-power of the engine at all speeds of the driven member, even the slowest. Consequently heavy loads may be driven and heavy grades overcome with ease and at a speed limited only by the power capacity of the prime mover. Skilled operators are not required as the various steps of speed control are made by the simple manipulation of a single lever.

I have shown a centrifugal pump connected with the engine as these are desirable with high-speed engines on account of their simplicity, light weight, and efficiency at high speeds. I do not, however, limit myself to any specific type of pump. The peculiar manner of connecting this pump with the engine shaft so that its rotating parts act as a fly-wheel therefor, and the manner in which the pump is rendered inoperative at certain parts of the operation have been disclosed by me in a copending application for Patent Serial Number 470,271 filed Dec. 31, 1908.

It is not necessary to use the form of motor which I have shown to successfully carry out this invention. I have shown a two-part pump, but this number of pump parts may be increased if desired to get greater variations of pressure and volume, and so far as some parts of the invention are concerned, a pump motor may be used. A motor with a greater or smaller number of chambers with their coöperating rotary parts may be employed according to the number of steps of speed control desired.

The principles of the invention as herein disclosed might be embodied in many specifically different structures, and I wish, therefore, not to be limited to the particular construction herein disclosed.

The hydraulic mechanism may be constructed of nickel-steel or aluminum in order to get structures of light weight. The valves shown herein are more or less diagrammatic but are sufficient to show the operation of the invention. In practice I prefer to use balanced valves which are not shown on account of their needlessly encumbering the drawings.

The motor consists, as I have shown, of a shell forming a plurality of compartments, in each of which are certain rotary parts connected to a common driving shaft. If desired, I can use more than one of these compound motors, in which case I preferably connect them in multiple.

What I claim is:—

1. In combination with a prime mover, a pump arranged to be driven thereby, a fluid pressure motor comprising a plurality of sections arranged to be actuated by fluid pressure generated by the pump, a by-pass for each motor section, valve mechanism arranged to control at will the flow of fluid through said motor and controlling and operating said by-passes in a predetermined order, said valve mechanism being arranged to disconnect one or more sections of the motor from the fluid pressure and to open automatically the by-pass valve for each disconnected motor section.

2. In combination with a prime mover, a pump arranged to be driven thereby and operable to deliver fluid at different pressures, a pump valve controlling the circulation of fluid through the pump and thereby controlling the fluid pressure, a motor comprising a plurality of sections arranged to be driven by the fluid from the pump, a valve for connecting the fluid with a desired number of sections of the motor, and means for conjunctively controlling the pump valve and the motor valve.

3. In combination with a prime mover, a pump arranged to be driven thereby and operable to deliver fluid at different pressures, a pump valve controlling the circulation of fluid through the pump and thereby controlling the fluid pressure, a motor comprising a plurality of sections arranged to be driven by the fluid from the pump, a valve for connecting the fluid with a desired number of sections of the motor, and mechanical means for conjunctively controlling the pump valve and the motor valve in a series of steps, to thereby obtain desired speeds with inversely proportional torques from the motor.

4. In combination with a prime mover, a multiple pressure pump arranged to be driven thereby, a pump valve controlling the pressure of fluid delivered by the pump, a motor comprising a plurality of sections arranged to be driven by the fluid from the pump, a valve for connecting the fluid with a desired number of sections of the motor, said valves being arranged to connect the fluid from the pump to the motor and from the motor back to the pump, and mechanical means for conjunctively controlling the pump valve and the motor valve in a series of steps, to thereby obtain desired speeds with inversely proportioned torques from the motor.

5. In combination with a prime mover, a pump arranged to be driven thereby and comprising a plurality of sections, a pump valve operable to vary the path of circulation through the pump and thereby vary the fluid pressure from the pump, a motor comprising a plurality of sections arranged to be driven by the fluid from the pump, a valve for connecting the fluid with the motor, said motor valve arranged to cut off one or more sections of the motor, and mechanical means for conjunctively controlling the pump valve and the motor valve at will in a series of steps to thereby obtain desired speeds with inversely proportional torques from the motor.

6. In combination with a prime mover, a pump arranged to be driven thereby, said pump comprising a plurality of rotary members, a valve therefor arranged to connect said members to work in series and in parallel, a fluid pressure motor comprising a plurality of compartments, and a rotary piston within each compartment, a valve arranged to connect the fluid from the pump with a desired number of the compartments of the motor, and mechanical means for conjunctively controlling the pump valve and the motor valve.

7. In combination with a prime mover, a centrifugal pump arranged to be driven thereby, said pump comprising a plurality of rotary members, a valve therefor arranged to connect said members to work in series or in parallel, a fluid pressure motor comprising a plurality of compartments, a rotary piston within each compartment, and a by-pass for each compartment; a valve arranged to connect the fluid from the pump with the motor, to disconnect a desired number of the motor compartments from the fluid, and to open the by-pass for each disconnected compartment, and mechanical means for conjunctively controlling the pump valve and the motor valve in a series of steps, to thereby obtain desired speeds with inversely proportional torques from the motor.

8. In combination with a prime mover, a pump arranged to be driven thereby, a fluid pressure motor, a driven mechanism, said motor comprising a plurality of sections and arranged to be run by fluid from the pump, means for connecting the fluid at will with a desired number of sections of the motor to cause the motor to drive said mechanism at desired speeds and with inversely proportional torques, mechanism for increasing the speed of the prime mover to increase the speed and torque of the motor, and operating connections between said means and said mechanism.

9. In combination with a prime mover, a pump arranged to be driven thereby, a fluid pressure motor, a driven mechanism, said motor comprising a plurality of sections and arranged to be run by fluid from the pump, manually actuated valve mechanism for directing the fluid to and from a desired number of sections of the motor to cause the motor to drive said mechanism at desired speeds and with inversely proportional torques, means dependent upon the position of the valve mechanism and means for increasing at will the speed of the prime mover and to increase the speed and torque of the motor.

10. In combination with a prime mover, a pump arranged to be driven thereby, a pump valve controlling the path of circulation through the pump and thereby controlling the pressure of fluid from the pump, a motor comprising a plurality of sections arranged to be driven by the fluid from the pump, a valve for connecting the fluid with a desired number of sections of the motor, manually actuated mechanical means for conjunctively controlling the pump valve and the motor valve in a series of steps to thereby obtain desired speeds with inversely proportional torques from the motor, and means under the control of an operator whereby the speed of the prime mover may be increased to increase the speed and torque of the motor.

11. In combination with an internal combustion engine, a rotary pump arranged to be driven thereby, valve mechanism controlling the volume and pressure of fluid delivered by the pump, a rotary motor comprising a plurality of sections arranged to be driven by fluid from the pump, a driven mechanism mechanically connected with the motor, valve mechanism for connecting the fluid with a desired number of sections of the motor, a device for operating said mechanism and controlling the order in which the motor sections are connected with the fluid supply to thereby cause the motor to drive said driving mechanism at desired speeds with inversely proportional torques, a throttle valve for the engine, and means under the control of an operator for opening said valve to increase the speed of the engine and to increase the speed and torque at which the motor drives the driven mechanism.

12. In combination with an internal combustion engine, a pump arranged to be driven thereby, a motor comprising a plurality of sections arranged to be actuated by fluid from the pump, mechanism for connecting the fluid with a desired number of sections of the motor, to thereby run the motor at different speeds and with inversely proportional torques, a throttle valve for the engine, and means dependent upon the position of said mechanism for actuating the throttle valve to vary the speed of the engine and of the motor.

13. In combination with an internal combustion engine, a pump arranged to be driven thereby, a motor comprising a plurality of sections arranged to be actuated by fluid from the pump, means for connecting the fluid with a desired number of sections of the motor, to thereby run the motor at different speeds and with inversely proportional torques, a throttle valve for the engine, means for automatically maintaining the speed of the engine at a practically constant rate, means under control of an operator for varying the speed of the engine and of the motor, and means operable only after said first named means has been operated to a predetermined position.

14. In combination with a prime mover, a pump arranged to be driven thereby, a motor arranged to be actuated by fluid from said pump, said motor comprising a plurality of sections, means for connecting said fluid at will with a desired number of sections of said motor, to thereby run the motor at different speeds, a driven mechanism, and means for connecting said mechanism with either the motor or the prime mover.

15. In combination with a prime mover, a pump arranged to be driven thereby, a motor arranged to be actuated by fluid from said pump, said motor comprising a plurality of sections, means for connecting said fluid at will with a desired number of sections of said motor, to thereby run the motor at different speeds, a driven mechanism, means for connecting said mechanism with the motor, and for disconnecting the mechanism from the motor and connecting the mechanism with the prime mover.

16. In combination with a prime mover, a pump arranged to be driven thereby, a motor arranged to be actuated by fluid from said pump, said motor comprising a plurality of sections, controlling means for connecting said fluid at will with a desired number of sections of said motor, to thereby run the motor at different speeds, a driven mechanism, and means for connecting said mechanism with either the motor or the prime mover, said controlling means being arranged to disconnect the driven mechanism from the motor and to connect said mechanism with the prime mover after the motor has attained its maximum speed.

17. In combination with a prime mover, a pump arranged to be driven thereby, a motor arranged to be actuated by fluid from said pump, said motor comprising a plurality of sections, controlling means for connecting said fluid at will with a desired number of sections of said motor, to thereby run the motor at different speeds, a driven mechanism, and means for connecting said mechanism with either the motor or the prime mover, said controlling means being arranged to disconnect the driven mechanism from the motor, to disconnect the fluid from the motor, and to connect said mechanism with the prime mover after the motor has attained its maximum speed.

18. In combination with an internal combustion engine, means for automatically maintaining the speed thereof practically constant, a pump arranged to be driven by the engine, a motor arranged to be actuated by fluid from the pump, a driven mechanism connected therewith, said motor comprising a plurality of sections, controlling means for connecting the fluid at will with a desired number of sections of the motor, to thereby cause the motor to drive the driven mechanism at different speeds in a series of steps, means under control of an operator for increasing the speed of the engine and the driven mechanism at any of said steps, and additional means dependent on the number of motor sections connected with fluid, for increasing the speed of the engine.

19. In combination with an internal combustion engine, means for automatically maintaining the speed thereof at a practically constant rate, a pump arranged to be driven by the engine, a motor arranged to be actuated by fluid from the pump, a driven mechanism 13 connected therewith, said motor comprising a plurality of sections, controlling means for connecting the fluid at will with a desired number of sections of the motor, to thereby cause the motor to drive the driven mechanism at different speeds in a series of steps, and means under control of an operator for increasing the speed of the engine and the driven mechanism at any of said steps, the controlling means being arranged to disconnect the driven mechanism from the motor, to connect said mechanism with the engine, and to cut off the fluid from the motor after the motor has attained its maximum speed.

20. In combination with an internal combustion engine, a throttle valve therefor, a centrifugal governor driven by the engine and arranged to actuate the throttle valve to maintain the speed of the engine at a practically constant rate, a pump arranged to be driven by the engine, a motor arranged to be actuated by fluid from the pump, a driven mechanism connected therewith, said motor comprising a plurality of sections, controlling means for connecting the fluid at will with a desired number of sections of the motor, to thereby cause the motor to drive the driven mechanism at different speeds in a series of steps, and means under control of an operator for increasing the speed of the engine and the driven mechanism at any of said steps, the controlling means being arranged to disconnect the driven mechanism from the motor, to connect said mechanism with the engine, and to cut off the fluid from the motor after the motor has attained its maximum speed, and means for insuring the full opening of the throttle valve when the driven mechanism is connected with the engine.

21. In combination, an internal combustion engine, a pump arranged to be driven thereby, a fluid supply, means for conveying fluid from said supply to the pump, a motor comprising a plurality of sections arranged to be actuated by the fluid from the pump, a driven mechanism, mechanical connections between the driven mechanism and the motor, and means for regulating the speed and the torque of the driven member in a series of steps, said means comprising conjunctively operating devices, whereby the pump connections are changed, the fluid supply to the motor altered, and the mechanical connections shifted to disconnect the motor from the driven mechanism and connect the latter to the engine independently of the motor.

22. In combination with an internal combustion engine, automatical means for maintaining the speed thereof practically constant, a pump arranged to be driven thereby, a fluid supply, connections from said supply to the pump, a motor comprising a plurality of sections arranged to be actuated from the pump by the fluid, a driven mechanism, mechanical connections between said mechanism and the motor, and means for regulating the speed and the torque of the driven member in a series of steps, said means comprising conjunctively operating devices whereby the pump connections are changed, the fluid supply to the motor altered, and the mechanical connections shifted to connect the driven mechanism to the engine independently of the transmission of fluid pressure, and further means under the control of an operator for increasing the speed of the engine at will.

23. In combination, a prime mover, a pump arranged to be driven thereby, a fluid pressure motor arranged to be actuated by fluid from the pump, said motor comprising a casing divided into a plurality of closed compartments of different sizes, a rotary member within each compartment, valve mechanism, manual means for controlling said valve mechanism to connect the fluid with a desired number of said motor compartments, additional valve mechanism controlling a local circulation of liquid in the motor compartments, and gearing connecting the said valve mechanism and determining their relative movement.

24. In combination with a prime mover, a pump arranged to be driven thereby, a fluid pressure motor arranged to be actuated by fluid from the pump, said motor comprising a casing divided into a plurality of compartments of equal diameters but of different widths, a rotary piston member within each compartment, the casing being constructed to form a by-pass, an inlet port and discharge port for each compartment, a rotary valve for controlling all of the by-passes, a rotary valve for controlling all of the inlet and discharge ports, and manual means for actuating said rotary valves together to connect the fluid with and from the inlet and discharge ports of a desired number of said motor compartments, and to open the by-passes of such of the compartments as are not thus connected, to thereby run the motor at different speeds with inversely proportional torques.

25. In an automobile, the combination of a prime mover, a pump arranged to be driven thereby, a fluid pressure motor arranged to be actuated by fluid from the pump, a truck, driving gearing therefor connected with the motor, said motor comprising a plurality of sections, manual means for connecting the fluid at will with a desired number of motor sections to thereby cause the motor to drive the truck at different speeds and with inversely proportional torques, and means for disconnecting the motor from the driving gearing and driving the latter independently of the motor.

26. In an automobile, the combination of a prime mover, a pump directly actuated with and arranged to be driven thereby, a fluid pressure motor arranged to be actuated by fluid from the pump, a truck, driving gearing therefor, means for connecting said gearing with the motor, said motor comprising a plurality of separate cylindrical sections, manually controlled valve mechanism for connecting the fluid at will with a desired number of motor sections to thereby cause the motor to drive the truck at different speeds with inversely proportional torques in a series of steps, and means for connecting the driving gearing to be operated by the prime mover independently of fluid pressure.

27. In an automobile, the combination of a prime mover, a pump directly connected with and arranged to be driven thereby, a fluid pressure motor arranged to be actuated by fluid from the pump, a truck, driving gearing therefor, means for connecting said gearing with the motor, said motor comprising a plurality of sections, valve mechanisms for the pump and for the motor, a manually operated controlling device for conjunctively actuating said valve mechanisms to connect the fluid at will with a desired number of motor sections to thereby cause the motor to drive the truck at desired speeds with inversely proportional torques, and means actuated by the controlling device for disconnecting the driving gearing from the motor and connecting said gearing with the prime mover after the motor has attained its highest speed.

28. In an automobile, the combination of an internal combustion engine, a rotary pump directly connected with and arranged to be driven thereby, a rotary fluid pressure motor arranged to be driven by fluid from the pump, a truck, driving gearing therefor, a clutch for connecting said gearing with the motor, said motor comprising a plurality of sections of different capacities, valve mechanisms for the pump and for the motor, a manually operated controlling device for conjunctively actuating said valve mechanisms to connect the fluid at will with a desired number of motor sections to thereby cause the motor to drive the truck at different speeds with inversely proportional torques, a clutch for connecting the driving gearing with the engine, means actuated by the controlling device for disconnecting the motor clutch and connecting the engine clutch after the motor has attained its highest speed, and a reversing valve arranged to reverse the direction of rotation of the motor and the direction of travel of the truck when driven by the motor.

29. In an automobile, the combination of an internal combustion engine, a throttle valve therefor, a centrifugal governor arranged to actuate the throttle valve and to normally maintain the speed of the engine at a practically constant rate, a centrifugal pump having a rotary member directly connected with the engine and arranged to be driven thereby, a rotary fluid pressure motor arranged to be driven by fluid from the pump, a truck, driving gearing therefor, a clutch for connecting said gearing with the motor, said motor comprising a plurality of sections of different capacities, valve mechanisms for the pump and for the motor, a manually operated controlling device for conjunctively actuating said valve mechanisms to connect the fluid at will with a desired number of motor sections to thereby cause the motor to drive the truck at different speeds with inversely proportional torques in a series of steps, means under the control of an operator for opening the throttle valve to increase the speed and power of the engine at any of said steps, a clutch for connecting the driving gearing with the engine, and means actuated by the controlling device for disconnecting the motor clutch and for connecting the engine clutch after the motor has attained its highest speed.

30. In an automobile, the combination of an internal combustion engine, a throttle valve therefor, a centrifugal governor driven by the engine and arranged to actuate the throttle valve to normally maintain the speed of the engine at a practically constant rate, a centrifugal pump having a plurality of rotary members directly connected with the engine and arranged to be driven thereby, and to pump a fluid in series or in parallel at different pressures, a rotary fluid pressure motor arranged to be driven by fluid from the pump, a truck, driving gearing therefor, a clutch for connecting said gearing with the motor, a steering wheel for the truck, said motor comprising a plurality of sections of different capacities, valve mechanism for the pump and for the motor, a manually operated controlling device comprising a controlling lever associated with the steering wheel and arranged to conjunctively actuate said valve mechanisms to connect the fluid at will with a desired number of motor sections and at different pressures, to thereby cause the motor to drive the truck at different speeds with inversely proportional torques in a series of steps, a treadle connected with the throttle valve whereby the speed of the engine may be increased during any of said steps, a clutch for connecting the driving gearing with the engine, clutch-actuating mechanism operated by the controlling device for disconnecting the motor clutch, connecting the engine clutch, and rendering the pump and the motor inoperative after the motor has attained its highest speed, a mechanical connection between the clutch-actuating-mechanism and the throttle valve for insuring the full opening of the throttle valve when the engine is connected with the driving gearing, a reversing valve between the pump and the motor, and a treadle for actuating the reversing valve.

In testimony whereof, I have signed my name to this specification in the presence of two subscribing witnesses.

AUGUST SUNDH.

Witnesses:
JAMES G. BETHELL,
JOHN F. RULE.